United States Patent [19]

Austin

[11] Patent Number: 4,760,652
[45] Date of Patent: Aug. 2, 1988

[54] COMPOSITE OUTSOLE

[75] Inventor: Arnold S. Austin, Brookfield, Mass.

[73] Assignee: Quabaug Corporation, North Brookfield, Mass.

[21] Appl. No.: 57,301

[22] Filed: Jun. 4, 1987

[51] Int. Cl.$^4$ ............................ A43B 5/06; A43B 5/00
[52] U.S. Cl. .................................. 36/30 R; 36/32 R; 36/59 C
[58] Field of Search ............... 36/31, 30 R, 32 R, 116, 36/113, 25 R, 59 R, 59 C; D2/320

[56] References Cited

U.S. PATENT DOCUMENTS

| | | | |
|---|---|---|---|
| 3,295,230 | 1/1967 | Szerenyi et al. | 36/59 C |
| 3,824,716 | 7/1974 | DiPaolo | 36/32 R |
| 4,378,641 | 4/1983 | Tarlow | 36/32 R |
| 4,570,362 | 2/1986 | Vermonet | 36/32 R |

FOREIGN PATENT DOCUMENTS

| | | | |
|---|---|---|---|
| 0171697 | 2/1980 | European Pat. Off. | 36/31 |
| 258826 | 10/1912 | Fed. Rep. of Germany | 36/31 |
| 831962 | 2/1952 | Fed. Rep. of Germany | 36/32 R |
| 986526 | 8/1951 | France | 36/59 R |
| 1108501 | 1/1956 | France | 36/25 R |
| 70390 | 4/1959 | France | 36/32 R |
| 2540360 | 8/1984 | France | 36/32 R |
| 471179 | 8/1937 | United Kingdom | 36/59 C |

*Primary Examiner*—Steven N. Meyers
*Attorney, Agent, or Firm*—Samuels, Gauthier, Stevens & Kehoe

[57] ABSTRACT

A composite outsole has a substantially planar first element with a bottom tread surface, a top surface spaced from the bottom surface, and an outwardly facing side edge extending around the bottom tread surface. A lip extends around the top surface and protrudes laterally beyond the outwardly facing side edge.

A second element is molded onto the top surface of the first element. The second element has a peripheral portion overlapping the lip of the first element. An inwardly facing side edge on the peripheral portion is spaced laterally from the outwardly facing side edge of the first element to define a downwardly open groove therebetween.

5 Claims, 2 Drawing Sheets

COMPOSITE OUTSOLE

BACKGROUND OF THE INVENTION

1. Field of the Invention

This invention relates to an improvement in composite outsoles of the type having a bottom element forming the tread surface and an upper element molded to the top surface of the bottom element.

2. Description of the Prior Art

A bottom view of a prior art outsole 10 is shown in FIG. 1, and a cross section of the same outsole is shown in FIG. 2 at the conclusion of the molding operation. The outsole 10 includes a substantially planar first element 12 of rubber-like material having a bottom tread surface which is typically scored or grooved as at 14. The first element 12 is appropriately configured and dimensioned to be received in a central cavity 16 in the base 18 of a two part mold. The cavity 16 is surrounded by an upstanding rim 20, which in turn is surrounded by a relatively wide channel 22. In order to ensure that the first element 12 lies flat within the cavity 16, it is necessary to provide some small clearance 24 between its peripheral side edge and the surrounding rim 20. The mold is closed by a lid 26, and a second element 28 of the outsole is molded onto the top surface of the first element 12. Typically, the second element is formed from a foamable material, e.g., polyurethane, which is introduced into the mold in a liquid state and allowed to foam in place.

A problem with this arrangement is that during the foaming step, the internal mold pressure sometimes forces some of the liquid foamable material through the clearance 24 and into the scores, grooves or spaces 14 in the bottom tread surface of the first element. When this occurs, as indicated for example at 30 in FIGS. 1 and 2, the resulting product is defective and must be scrapped.

The objective of the present invention is to avoid the above-described problem by effectively blocking any penetration of the liquid foamable material between the first element and the surrounding mold surfaces.

DESCRIPTION OF PREFERRED EMBODIMENT

Figure 1:
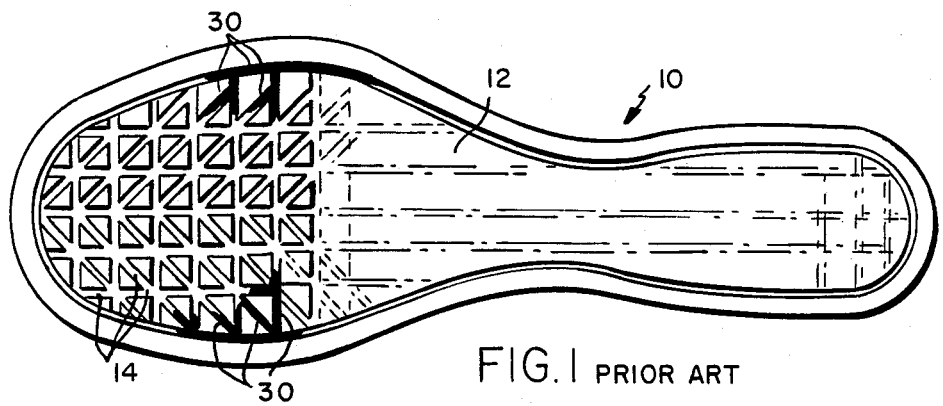
FIG. 1 is a bottom plan view of a typical prior art composite outsole.
Figure 2:
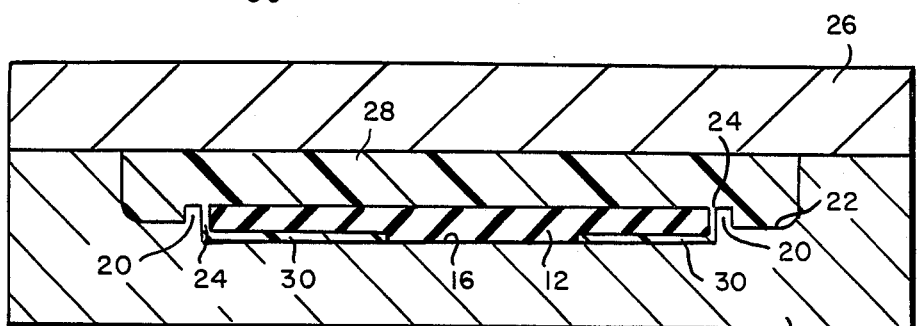
FIG. 2 is a cross sectional view showing the prior art outsole at the conclusion of the molding operation.
Figure 3:
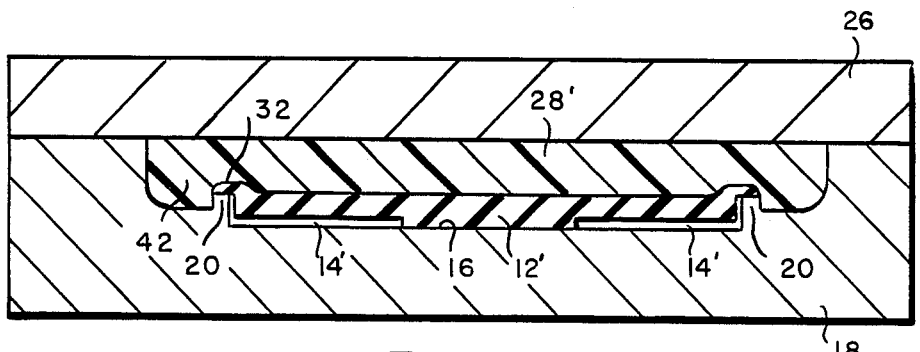
FIG. 3 is a sectional view similar to FIG. 2, showing the outsole of the present invention.
Figure 4:
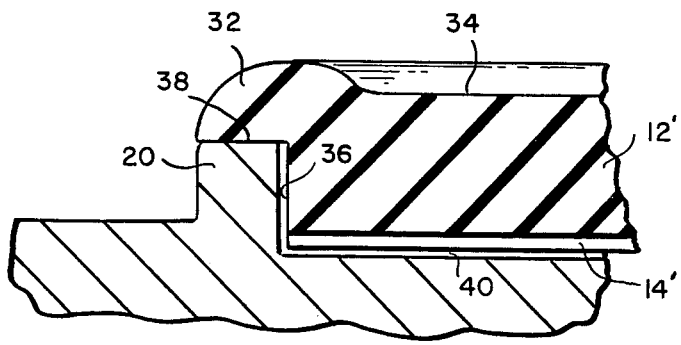
FIG. 4 is a partial enlarged sectional view showing the positioning of the first element of the present invention in the mold cavity.
Figure 5:
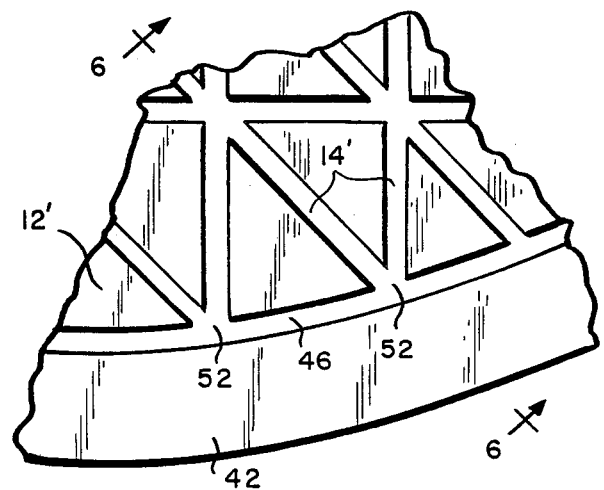
FIG. 5 is an enlarged bottom plan view of a portion of an outsole of the present invention.
Figure 6:
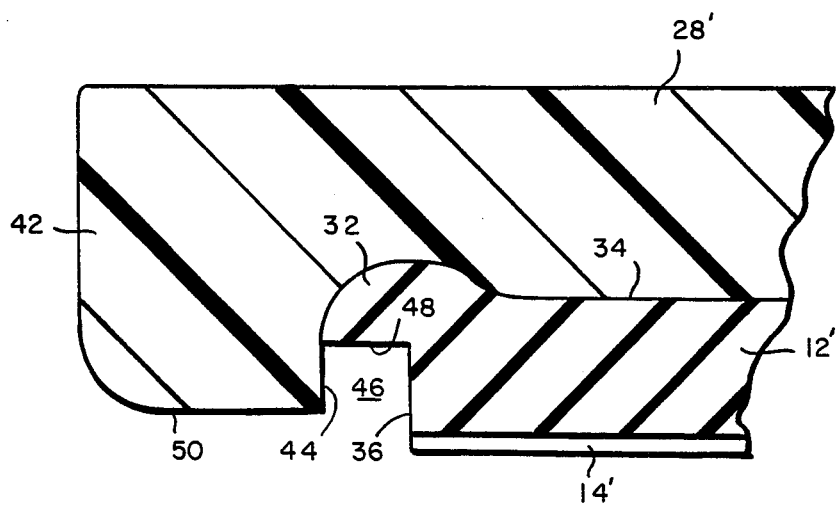
FIG. 6 is a sectional view taken along line 6—6 of FIG. 5.

Referring now to FIGS. 3-6, the composite outsole of the present invention also includes a substantially planar first element 12' of rubber-like material with a bottom tread surface which is scored or grooved as at 14' to provide a selected pattern. The first element 12' has a peripheral lip 32 extending around its top surface 34 and protruding laterally beyond its side edge 36. With reference in particular to FIG. 4, it will be seen that the lip 32 is configured and dimensioned to overlap and sit on the mold rim 20, thereby establishing a sealing interface as at 38. The thickness of the first element 12' in relation to the lip 32 is such that when the first element is received in the mold cavity 16, a slight clearance 40 is present between the bottom tread surface and the bottom of the cavity. This insures that the lip 32 is always properly seated on the rim 20. Preferably, the lip 32 protrudes above the plane of the top surface 34.

As with the prior art outsole, the present invention also includes a second element 28' molded onto the top surface of the first element 12'. A peripheral portion 42 of the second element overlaps the lip 32 of the first element. The peripheral portion 42 has an inwardly facing side edge 44 which is spaced laterally from the outwardly facing side edge 36 of the first element to define a downwardly open groove 46 therebetween. The base of the groove 46 is defined by the underside 48 of the lip 32.

The peripheral portion 42 extends downwardly below the lip 32, with the underside 50 of the peripheral portion 42 being located vertically above the tread surface on the underside of the first element 12'. The grooves 14' communicate as at 52 with the open groove 46.

During the molding operation, the sealing interface 38 between the lip 32 and the rim 20 prevents the liquid polyurethane being used to form the second element 28' from penetrating past the rim and into the grooves 14' of the tread surface. Thus, the finished product has a neat appearance, with the grooves 46 and 14' being entirely free of polyurethane. The overall attractiveness of the product is further enhanced by the fact that the base of the groove 46 is defined by the underside 48 of the lip 32, i.e., by the same material as that forming the bottom tread surface.

I claim:

1. A composite outsole comprising:
   a substantially planar first element formed of a first material, said first element having a bottom tread surface, a top surface spaced from said bottom surface by the thickness of said first element, an outwardly facing side edge extending around said bottom tread surface, said bottom tread surface being interrupted by a plurality of grooves extending to said side edge, and a lip extending around said top surface, said lip having an underside protruding laterally beyond said side edge; and
   a second element molded onto the top surface of said first element, said second element consisting of a second material which is different from said first material, said second element having a peripheral portion overlapping said lip in a manner allowing only the underside thereof to remain exposed, said peripheral portion having an inwardly facing side edge spaced laterally from the outwardly facing side edge of said first element to define a downwardly open groove therebetween, with the underside of said lip defining the base of said groove.

2. The composite outsole of claim 1 wherein said lip protrudes above the plane of said top surface.

3. The composite outsole of claim 1 wherein said peripheral portion protrudes downwardly below the level of said lip.

4. The composite outsole of claim 3 wherein the lowermost surface of said peripheral portion is spaced vertically above the plane of said tread surface.

5. The composite outsole of claim 1 wherein said tread surface includes grooves communicating with said downwardly open groove.

* * * * *